Patented Dec. 28, 1948

2,457,203

UNITED STATES PATENT OFFICE 2,457,203

METHOD OF MAKING SCENTING ESSENTIAL OILS FROM PLANTS

Arno Brasch, Brooklyn, N. Y., assignor, by mesne assignments, to Electronized Chemicals Corporation, a corporation of Delaware No Drawing. Application July 17, 1947,
Serial No. 761,744

13 Claims. (Cl. 47—1.3)

This application is a continuation-in-part of my U. S. patent applications Serial No. 442,136, filed May 7, 1942, for Method for manufacturing synthetic rubber and devices therefor; Serial No. 442,137, filed May 7, 1942, for Devices for treatment of matters with high speed electrons; Serial No. 442,138, filed May 7, 1942, for Method for treatment of matter; Serial No. 450,923, filed July 14, 1942, for Method and means for treatment of perishable substances and products so obtained; Serial No. 451,370, filed July 17, 1942, for Method and means for treatment of vegetative substances and products so obtained; Serial No. 487,179, filed May 15, 1943, for Process for cracking hydrocarbons by means of ultra high speed electrons; Serial No. 488,278, filed May 24, 1923, for Preparation and cracking of hydrocarbons and other chemical compounds by means of ultra high speed electrons to obtain rubber starting materials; and Serial No. 575,878, filed February 2, 1945, for Sterilization of therapeutical preparations. Serial Nos. 442,136; 442,138; 450,923; 451,370; 487,179; are now abandoned. Serial No. 442,137 is now Patent No. 2,429,217.

My invention relates to methods of creating scenting essential oils.

It is an object of my present invention to increase the amount of scenting essential oils formed by cut plants, particularly cut flowers.

It is also an object of my present invention to provide methods for preventing wilting of flowers for a considerable time after they have been cut.

With the above objects in view, I herewith propose to create scenting essential oils by irradiating cut plants adapted to form such oils with corpuscular rays, particularly high speed electrons.

In accordance with a preferred embodiment of my invention, the cut plants irradiated as set forth above are stored for a relatively long period of time during which they will continue to form scenting essential oils without substantially wilting; these scenting essential oils are then extracted from the irradiated cut plants in usual manner.

I have found that by my new processes it is possible to greatly increase the amount of essential oils obtained compared with the conventional extracting methods in which the essential oils are removed immediately or shortly after cutting of the plants.

This is due to the fact that by irradiating cut plants, e. g. cut flowers and treating them as proposed above, it is possible to destroy the enzymes which cause wilting and decay of the plants after they are cut without substantially inhibiting the faculty of the cut flowers to form essential oils.

Tests carried out by me prove that the processes of formation of essential oils are of a lower order than the formation of enzymes causing wilting and decay and that the corpuscular rays, particularly high speed electrons, used for irradiation purposes do not attack such processes of lower order but only the processes of higher order, causing wilting and decay of the cut flowers.

In this manner, it is possible to retain the cut plants, e. g. cut flowers in their original state without wilting and decay for a considerable time during which they will continue to form essential oils.

I have found that long lasting irradiation with high speed electrons caused certain undesired side reactions, such as creation of hydrogen peroxide and like substances.

These side reactions are mainly due to the interactions of the electrons with the atmosphere surrounding the irradiated cut plants and the reactive substances within these plants, to the production of heat and other related factors, and not the action of the high speed electrons proper.

I have also found that these side reactions can be reduced by shortening the time periods during which the cut plants are irradiated. Therefore, a preferred embodiment of the process according to my present invention mainly consists in irradiating the cut plants to be treated with high speed electrons during one or more extremely short time periods. Such reduction of the length of the single irradiation periods results in reduction or avoidance of the above listed undesired side reactions.

Furthermore, it is important to avoid creation of heat in the irradiated plants; this is also attained by reducing the length of the single irradiation periods.

I have obtained very good results by using for by new processes according to my present invention high speed electrons of a velocity equivalent to more than one, preferably more than four million volts; excellent results were obtained by use of high speed electrons of a velocity equivalent to about six million volts.

Furthermore, I have found it advisable to reduce the single irradiation periods to less than $10^{-4}$, preferably to about $10^{-6}$ of a second. In some cases, it will even be indicated to use irradiation periods each lasting $10^{-7}$ of a second, or less.

I wish to emphasize that the short duration of the single irradiation periods does not change the effect of such irradiations on the cut plants; I found that such irradiations have the desired effect, i. e., destroy enzymes creating wilting of the cut plants, inasmuch as such enzymes need not be killed entirely during a single irradiation period, but only be vigorously attacked, such attacks, particularly if repeated during consecutive short irradiation periods, weaken these enzymes which will then die a certain time after the irradiations are actually terminated.

Thus, it is evident that the length of each of the single irradiation periods is of minor importance from the point of view of destruction of the undesired enzymes, but that only the total length of the irradiation periods together decides the irradiation effect.

Therefore, in order to obtain optimal effects, I propose, in accordance with my present invention, to irradiate the cut plants to be treated with high speed electrons during a series of consecutive very short time periods.

The number of single irradiation periods needed depends upon the character of the irradiated plants; thus, it is necessary that on the average each undesired micro-organism present in the cut plants to be treated is hit during all consecutive short irradiation periods together by electrons having a total intensity of about $10^{-15}$ of a watt.

I have found that the above mentioned intensity of irradiation is necessary to destroy a micro-organism; thus, it is advisable to regulate the velocity of the high speed electrons used for the treatment and the length of each irradiation period and their number in such a manner as to obtain the above indicated total intensity, i. e., to obtain an irradiation by which on the average each of the micro-organisms is hit during all consecutive irradiation periods together by electrons having the above indicated total intensity of $10^{-15}$ of a watt.

I may use for my new processes described above different types of devices for creating high speed electrons and also the most differently constructed and shaped irradiation chambers. However, I have found that the devices described in my U. S. Patents Nos. 2,043,733 and 2,099,327 are very well adapted and the most efficient ones for the purposes of my present invention. Thus, while any source of radiation can be used for the production of high speed electrons, my so-called condenser method which generates electric impulses of very short duration and great intensity by use of a laminated discharge tube proved most satisfactory. This method consists in using a plurality of condenser units, the number of which is selected according to the voltage required, charging these condenser units in parallel over charging resistances and discharging them by means of discharge spark gaps in series whereby the voltage is multiplied in accordance with the number of condenser units employed and in accordance with the voltage with which each of the individual condenser units has been charged.

This high voltage which is at least one million volts, preferably however, three or more million volts, is conducted to the cathode of a laminated discharge tube also described in my above mentioned U. S. patents. A discharge tube of this type is adapted to create high speed electrons having the required high velocity and adapted for the sterilizing irradiation processes described above.

Although my above described processes are effective for a great variety of cut plants, it is rather difficult to obtain satisfactory results with certain types of plants. Thus, it is not always possible, by increase of the speed of the irradiating electrons and decrease of the length of the single irradiation periods, to avoid entirely certain of the above listed side effects, namely, the creation of hydrogen peroxide and ozone and the denaturation of certain proteins. Furthermore, during irradiation of certain types of plants, additional side reactions occur, which cannot be eliminated by the raise of the velocity of the irradiating electrons and by reduction of the length of the single irradiation periods.

I have found that such additional side reactions can be greatly reduced and in most cases completely avoided by cooling the cut plants to be treated to a low temperature and irradiating the thus cooled cut plants in the manner described above.

The degree of cooling depends on the character of the single plants to be irradiated: Good results were already obtained by cooling to a temperature of 0° C. or less.

Tests proved that by first cooling the cut plants to the low temperatures mentioned above and then subjecting the thus cooled plants to a series of very short irradiations by high speed electrons, it is possible to obtain very good results.

Generally, I have found that the combination of the three factors mentioned above, namely high speed electron irradiation, a series of very short irradiation periods, and cooling to a low temperature, not only suppresses oxidation, but also avoids all other above discussed side effects, leaving only the most rapidly occurring chemical and biological reactions, such as formation of essential oils, unaffected.

It should be mentioned that during irradiation of a few types of plants with high speed electrons, certain side reactions occur which can hardly be avoided by my new processes defined above. Cooling to very deep temperatures and very short irradiation periods, as proposed above, are insufficient to avoid oxidation of such plants during irradiation.

I have found advisable to irradiate such plants in accordance with my present invention in the absence of oxidizing agents, e. g. in an atmosphere having an oxygen concentration which is reduced to such a degree that the amount of oxygen molecules present is insufficient to react during irradiation with the irradiated plants. Such reduction of the oxygen concentration can be attained by use of an inert gaseous atmosphere, or by use of partial vacuum.

I have also found that in order to attain long lasting results, it is advisable to place the cut plants to be treated in electron permeable sealed containers and to irradiate the plants while they are sealed in such containers. Of course, as set forth above, these containers should contain only very little or no oxygen at all so as to prevent oxidation of the irradiated plants.

It is particularly advantageous to fill the container in which the cut plants are irradiated with an inert gas preventing oxidation of the irradiated cut plants.

I wish to stress that it is also possible to subject the cut plants during irradiation to pressure, e. g. gas pressure, and to greatly further by such pressure the enzyme destroying effect of the irradiation.

In order to prevent exposure of the cut plants after irradiation to germs and similar micro-organisms causing decay of the plants, it is advisable to keep the irradiated cut plants in an at least substantially sterile atmosphere.

In accordance with my present invention, creating of scenting essential oils in preferably carried out in the following way:

First, the plants to be treated are placed into a container from which the air is removed, either by introduction of an inert gas or by evacuating the container.

After the plants to be treated are placed into the container and the air removed therefrom as described above, the container is air-tightly sealed.

Thereafter, the container together with the plants to be irradiated is cooled to 0° C. or below, depending upon the type of the plants.

The thus cooled container and plants to be irradiated are then subjected to irradiation with high speed electrons having a velocity equivalent to between three and six million volts during a series of consecutive very short time periods, each lasting between $10^{-4}$ and $10^{-6}$ of a second.

This impulse irradiation is continued until on the average each undesired micro-organism present in or on the irradiated plants before irradiation is hit by high speed electrons having a total intensity of at least $10^{-15}$ of a watt.

After irradiation, the irradiated cut plants are either left in the container for a considerable time or they are removed therefrom and placed in a sterile storage chamber or the like. They are kept in this storage chamber a considerable time, e. g. from a few days to several months, during which time they continue to form essential oils. The exact length of time depends, of course, on the type of plants treated and on the length of time during which such plants continue to create essential oils after being placed in the storage chamber.

Thereafter, the cut plants are removed from the storage chamber and the essential oils extracted therefrom in the usual manner.

It will be understood that each of the elements described above, or two or more together, may also find a useful application in other types of irradiation processes differing from the types described above.

While I have described the invention as embodied in processes for creating scenting essential oils, I do not intend to be limited to the details shown, since various modifications and changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. Method of making scenting essential oils by the use of a closed air-tight electron permeable container comprising the steps of placing cut plants adapted to form scenting essential oils in said closed air-tight electron permeable container; irradiating said cut plants through the wall of said air-tight electron permeable container with high speed electrons having a velocity equivalent to more than one million volts; storing said thus irradiated cut plants in said air-tight electron permeable container for a period of time sufficient for said irradiated cut plants to continue to form scenting essential oils without substantially wilting; removing thereafter said stored irradiated cut plants from said air-tight electron permeable container; and extracting the thus formed scenting essential oils from said stored irradiated cut plants.

2. Method of making scenting essential oils by the use of a closed air-tight electron permeable container comprising the steps of placing cut plants adapted to form scenting essential oils in said closed air-tight electron permeable container; irradiating said cut plants through the wall of said air-tight electron permeable container with high speed electrons having a velocity equivalent to more than one million volts during a series of very short irradiation periods; storing said thus irradiated cut plants in said air-tight electron permeable container for a period of time sufficient for said irradiated cut plants to continue to form scenting essential oils without substantially wilting; removing thereafter said stored irradiated cut plants from said air-tight electron permeable container; and extracting the thus formed scenting essential oils from said stored irradiated cut plants.

3. Method of making scenting essential oils by the use of a closed air-tight electron permeable container comprising the steps of placing cut plants adapted to form scenting essential oils in said closed air-tight electron permeable container; irradiating said cut plants through the wall of said air-tight electron permeable container with high speed electrons of a velocity equivalent to more than four million volts during a series of consecutive very short irradiation periods lasting each less than $10^{-4}$ of a second; storing said thus irradiated cut plants in an at least substantially sterile atmosphere for a period of time sufficient for said irradiated cut plants to continue to form scenting essential oils without substantially wilting; and extracting the thus formed scenting essential oils from said thus stored irradiated cut plants.

4. Method of making scenting essential oils by the use of a closed air-tight electron permeable container comprising the steps of placing cut plants adapted to form scenting essential oils in said closed air-tight electron permeable container filled with an inert gas; irradiating said cut plants through the wall of said air-tight electron permeable container with high speed electrons; storing said thus irradiated cut plants in an at least substantially sterile atmosphere for a period of time sufficient for said irradiated cut plants to continue to form scenting essential oils without substantially wilting; and extracting the thus formed scenting essential oils from said thus stored irradiated cut plants.

5. Method of making scenting essential oils by the use of a closed air-tight electron permeable container comprising the steps of placing cut plants adapted to form scenting essential oils in said closed air-tight electron permeable container filled with an inert gas under pressure; irradiating said cut plants through the wall of said air-tight electron permeable container with high speed electrons having a speed equivalent to more than one million volts; storing said thus irradiated cut plants in an at least substantially sterile atmosphere for a period of time sufficient for said irradiated cut plants to continue to form scenting essential oils without substantially wilting; and extracting the thus formed scenting essential oils from said thus stored irradiated cut plants.

6. Method of making scenting essential oils by the use of a closed air-tight electron permeable container comprising the steps of placing cut plants adapted to form scenting essential oils in said closed air-tight electron permeable container; cooling said cut plants in said air-tight electron permeable container to a low temperature; irradiating thereafter said cut plants while cooled to said low temperature through the wall of said air-tight electron permeable container with high speed electrons having a velocity equivalent to more than one million volts; storing said thus irradiated cut plants in an at least substantially sterile atmosphere for a period of time sufficient for said irradiated cut plants to continue to form scenting essential oils without substantially wilting; and extracting the thus formed scenting essential oils from said thus stored irradiated cut plants.

7. Method of making scenting essential oils by the use of a closed air-tight electron permeable container comprising the steps of placing cut plants adapted to form scenting essential oils in said closed air-tight electron permeable container; cooling said cut plants in said air-tight electron permeable container to a low temperature; irradiating thereafter said cut plants while cooled to said low temperature through the wall of said air-tight electron permeable container with high speed electrons; storing said thus irradiated cut plants in an at least substantially sterile atmosphere at a low temperature for a period of time sufficient for said irradiated cut plants to continue to form scenting essential oils without substantially wilting; and extracting the thus formed scenting essential oils from said thus stored irradiated cut plants.

8. Method of making scenting essential oils by the use of a closed air-tight electron permeable container comprising the steps of placing cut plants adapted to form scenting essential oils in said closed air-tight electron permeable container filled with an inert gas under partial vacuum; irradiating said cut plants through the wall of said air-tight electron permeable container with high speed electrons of a velocity equivalent to more than four million volts during a series of consecutive very short irradiation periods lasting each less than $10^{-4}$ of a second; storing said thus irradiated cut plants in an at least substantially sterile atmosphere for a period of time sufficient for said irradiated cut plants to continue to form scenting essential oils without substantially wilting; and extracting the thus formed scenting essential oils from said thus stored irradiated cut plants.

9. Method of making scenting essential oils by the use of a closed air-tight electron permeable container comprising the steps of placing cut plants adapted to form scenting essential oils in said closed air-tight electron permeable container filled with an inert gas; irradiating said cut plants through the wall of said air-tight electron permeable container simultaneously from several sides with high speed electrons of a velocity equivalent to more than one million volts during a series of consecutive very short irradiation periods lasting each less than $10^{-4}$ of a second; storing said thus irradiated cut plants in an at least substantially sterile atmosphere for a period of time sufficient for said irradiated cut plants to continue to form scenting essential oils without substantially wilting; and extracting the thus formed scenting essential oils from said thus stored irradiated cut plants.

10. Method of making scenting essential oils comprising the steps of irradiating cut plants when they are adapted to form scenting essential oils with high speed electrons of a velocity equivalent to more than one million volts; storing the thus irradiated cut plants under substantially dry sterile conditions for a period of time sufficient for said irradiated cut plants to continue to form scenting essential oils without substantially wilting; and extracting the thus formed scenting essential oils from said thus stored irradiated cut plants.

11. Method of making scenting essential oils comprising irradiating cut plants when they are adapted to form scenting essential oils with high speed electrons of a velocity equivalent to more than four million volts during a series of consecutive very short irradiation periods lasting each less than $10^{-4}$ of a second; storing said thus irradiated cut plants under at least substantially dry sterile conditions for a period of time sufficient for said irradiated cut plants to continue to form scenting essential oils without substantially wilting; and extracting the thus formed scenting essential oils from said thus stored irradiated cut plants.

12. Method of making scenting essential oils comprising the steps of irradiating cut plants when they are adapted to form scenting essential oils in an inert gas with high speed electrons having a velocity equivalent to more than one million volts; storing said thus irradiated cut plants under substantially dry sterile conditions for a period of time sufficient for said irradiated cut plants to continue to form scenting essential oils without substantially wilting; and extracting the thus formed scenting essential oils from said thus stored irradiated cut plants.

13. Method of making scenting essential oils comprising the steps of bombarding cut plants when they are adapted to form scenting essential oils at a low temperature with high speed electrons having a velocity equivalent to more than one million volts; storing said thus irradiated cut plants under substantially sterile conditions at a low temperature for a period of time sufficient for said irradiated cut plants to continue to form scenting essential oils without substantially wilting; and extracting the thus formed scenting essential oils from said thus stored irradiated cut plants.

ARNO BRASCH.

REFERENCES CITED

The following references are of record in the file of this patent:

UNITED STATES PATENTS

| Number | Name | Date |
|---|---|---|
| 924,284 | Smith | June 8, 1909 |
| 1,907,507 | Coolidge | May 9, 1933 |
| 1,937,536 | Steerup | Dec. 5, 1933 |
| 1,981,583 | Craig | Nov. 20, 1934 |
| 2,099,327 | Brasch | Nov. 16, 1937 |

FOREIGN PATENTS

| Number | Country | Date |
|---|---|---|
| 462,193 | France | Nov. 17, 1913 |
| 190,512 | Great Britain | Dec. 8, 1922 |
| 299,735 | Great Britain | Oct. 30, 1928 |

OTHER REFERENCES

Brasch, "Erzeugung und Anwendung," published Feb. 10, 1933, in Die Naturwissenschaften, vol. 21, pp. 82–86.